United States Patent [19]

Roller

[11] Patent Number: 4,811,451

[45] Date of Patent: Mar. 14, 1989

[54] WINDSHIELD WIPER INSTALLATION

[75] Inventor: Traugott Roller, Sulz-Wildberg, Fed. Rep. of Germany

[73] Assignee: Daimler-Benz Aktiengesellschaft, Stuttgart, Fed. Rep. of Germany

[21] Appl. No.: 105,286

[22] Filed: Oct. 7, 1987

[30] Foreign Application Priority Data

Oct. 9, 1986 [DE] Fed. Rep. of Germany ....... 3634407

[51] Int. Cl.$^4$ ................................................ B60S 1/46
[52] U.S. Cl. ...................................................... 15/250.04
[58] Field of Search .................... 15/250.01–250.04; 239/284 R

[56] References Cited

U.S. PATENT DOCUMENTS

| 3,407,426 | 10/1968 | Muller | 15/250.04 |
| 3,574,883 | 4/1971 | Brittain | 15/250.04 |
| 4,439,887 | 4/1984 | Fischer et al. | 15/250.04 |

FOREIGN PATENT DOCUMENTS

| 974732 | 4/1961 | Fed. Rep. of Germany . |
| 2643549 | 3/1978 | Fed. Rep. of Germany . |
| 2839298 | 3/1980 | Fed. Rep. of Germany . |
| 3102538 | 11/1982 | Fed. Rep. of Germany . |
| 2215307 | 6/1984 | Fed. Rep. of Germany . |
| 3309895 | 9/1984 | Fed. Rep. of Germany . |

Primary Examiner—Peter Feldman
Attorney, Agent, or Firm—Barnes & Thornburg

[57] ABSTRACT

A windshield wiper installation in which at least one nozzle of a windshield washing system partakes in the pivot movements of the wiper arm. In order to avoid with certainty a scratching of the windshield, provision is made according to this invention that the washing liquid is sprayed in a focused jet from the base of the wiper arm directly along the wiper blade to the free end thereof on the forward side of the wiper blade as viewed in the respective wiping direction.

8 Claims, 1 Drawing Sheet

U.S. Patent  Mar. 14, 1989  4,811,451
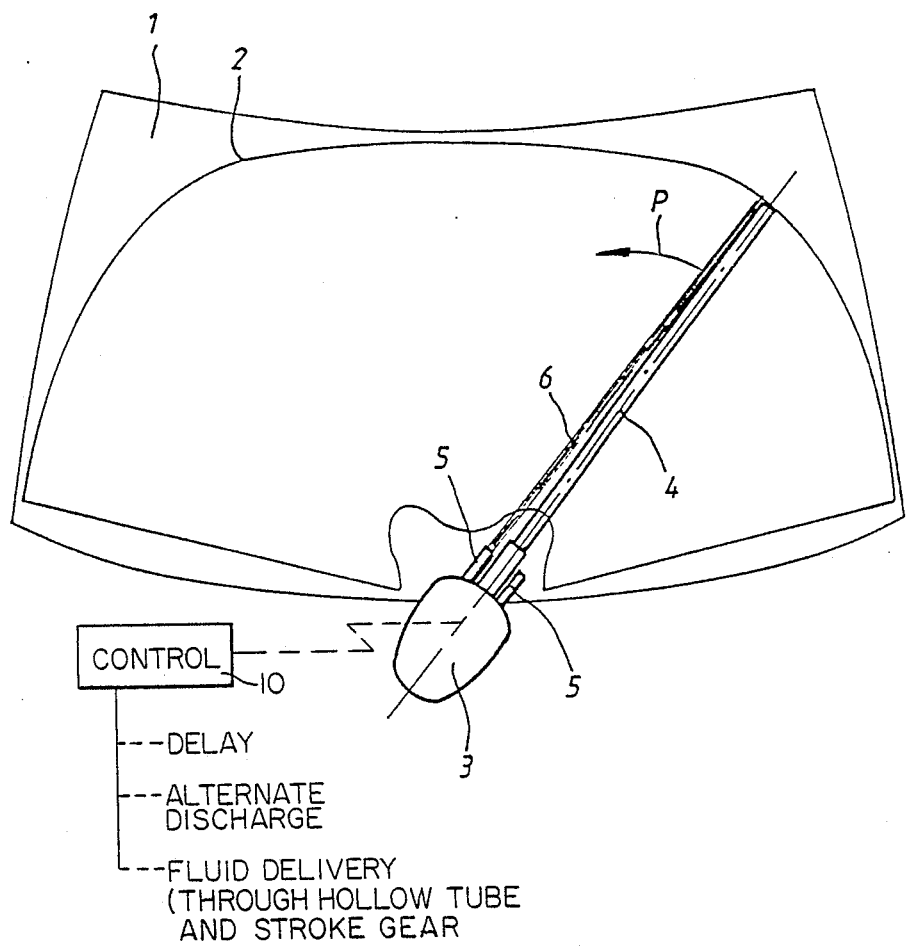

WINDSHIELD WIPER INSTALLATION

BACKGROUND AND SUMMARY OF THE INVENTION

The present invention relates to a windshield wiper installation, in which at least one nozzle of a windshield washing system participates in the pivot movements of the wiper arm.

With such types of windshield wiper installations, the washing liquid is customarily sprayed onto the windshield in a relatively widely fanned jet at a certain distance in front of the trailing wiper blade.

However, certain disadvantages are connected with such an installation. Thus, the wiper blade has a dry start-up range and dirt adhering to the wiper rubber is removed only incompletely. Additionally, the spray jet impinging on the windshield may have a certain disturbing effect on the driver and passenger.

The present invention is therefore concerned with the task to avoid these disadvantages and to provide a windshield wiper installation which assures a trouble-free operation without the danger of a scratching of the windshield by dry-running, respectively, soiled wiper blades.

The underlying problems are solved according to the present invention with a windshield wiper installation of the aforementioned type in that the washing liquid is sprayed in a focused jet from the base of the wiper arm directly along the wiper blade to the free end thereof on the side of the wiper blade disposed in front of the respective wiping direction.

A particularly favorable jet shape is achieved if, according to a further feature of the present invention, a pipe or tubular member without cross-sectional constriction in the discharge area serves as nozzle.

BRIEF DESCRIPTION OF THE DRAWING

These and further objects, features and advantages of the present invention will become more apparent from the following description when taken in connection with the accompanying drawing which shows, for purposes of illustration only, one embodiment in accordance with the present invention, and wherein:

The single FIGURE is a somewhat schematic elevational view of a windshield wiper installation in accordance with the present invention.

DETAILED DESCRIPTION OF THE DRAWING

Referring now to the single FIGURE of the drawing, a windshield 1 of a motor vehicle (not shown) is swept by a stroke-controlled, single-arm windshield wiper, whereby a wiped field 2 results.

The one-armed windshield wiper includes a driving head 3 accommodating the stroke gear and a wiper arm 4 whose instantaneous pivot direction is indicated by the arrow "P". The driving head encloses or is connected to the well known fluid and drive control shown schematically at 10 which is used for motor vehicle windshield wipers. In particular, such a control utilizes the normal mechanism for control of fluid between two nozzles such that the washing fluid is directed in advance of the wiper arm movement. The particular details of such a control form no part of the instant invention and are well within the purview of one skilled in the windshield art. An example of the specifics of such a control which could be used with the instant invention can be found in DE-OS No. 28 39 298. Likewise, the particular details of the drive mechanism for the wiper blades form no part of this invention and can be of any well known gearing arrangement such as is shown in DE-PS No. 22 15 307, for example. One nozzle 5 each of a windshield washing system is arranged on the driving head 3 on the two sides of the wiper arm 4, which are adapted to be activated alternately depending on the pivot direction of the wiper arm 4. With the pivot direction P illustrated in the drawing, the left nozzle 5 as viewed in the drawing discharges a focused jet 6 which extends along the wiper blade of the wiper arm 4 from the base end thereof to the upper free end.

Such an arrangement offers the advantage that dirt adhering to the wiper blade is dissolved and thus removed and no dry start-up phase of the wiper occurs so that a scratching of the windshield 1 is prevented with certainty. A further advantage resides in the fact that the spray jet is not noticed by the driver in a disturbing manner.

The feed line for the washing water to the nozzle or nozzles thereby extends through a hollow shaft and/or gear means of the wiper installation. The particular details of the system to feed the fluid through such a hollow shaft and/or gear are well known in the art as evidenced by DE-PS No. 974 732 and are not critical to the operation of the instant invention. Additionally, the pivot movement of the wiper arm may start with a delay compared to the feed supply of the washing liquid, utilizing conventional means to achieve such a control such as shown in DE-OS No. 26 43 549.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A windshield wiper installation, comprising a windshield washing system including at least one nozzle means, wiper arm means including wiper blade means, the nozzle means partaking in the pivot movements of the wiper arm means at a base end thereof, and washing liquid being sprayed from the nozzle means in a focused jet from the base of the wiper arm means directly along the side of the wiper blade means toward the free end thereof on the side of the wiper blade means disposed in front of the respective wiping direction.

2. A windshield wiper installation according to claim 1, wherein a tubular member without any substantial cross-sectional constriction in the discharge area serves as nozzle means.

3. A windshield wiper installation according to claim 1, wherein one nozzle means is arranged on each of the two sides of the wiper arm means, the nozzle means being alternately activatable.

4. A windshield wiper installation according to claim 1, wherein the installation is constructed as stroke-controlled, single-arm wiper installation including gear means, and feed line means to the nozzle means extending through at least one of hollow shaft and gear means.

5. A windshield wiper installation according to claim 1, further comprising means for starting the pivot movement of the wiper arm means with a delay compared to the feed beginning of the washing liquid.

6. A windshield wiper installation according to claim 3, wherein the installation is constructed as stroke-controlled, single-arm wiper installation including gear means, and feed line means to the nozzle means extending through at least one of hollow shaft and gear means.

7. A windshield wiper installation according to claim 6, further comprising means for starting the pivot movement of the wiper arm means with a delay compared to the feed beginning of the washing liquid.

8. A windshield wiper installation according to claim 7, wherein a tubular member without any substantial cross-sectional constriction in the discharge area serves as nozzle means.

* * * * *